May 14, 1968 T. R. MAYHEW 3,383,666

MULTISTAGE AMPLIFIER CIRCUITRY USED IN CONJUNCTION WITH HIGH SPEED DIGITAL COMPUTER MEMORIES

Filed May 28, 1964 2 Sheets-Sheet 1

INVENTOR.
THOMAS R. MAYHEW
BY John V. Regan
Attorney

May 14, 1968 T. R. MAYHEW 3,383,666

MULTISTAGE AMPLIFIER CIRCUITRY USED IN CONJUNCTION WITH HIGH SPEED DIGITAL COMPUTER MEMORIES

Filed May 28, 1964 2 Sheets-Sheet 2

INVENTOR.
THOMAS R. MAYHEW
BY John V. Regan
Attorney 3,383,666

MULTISTAGE AMPLIFIER CIRCUITRY USED IN CONJUNCTION WITH HIGH SPEED DIGITAL COMPUTER MEMORIES

Thomas R. Mayhew, Willingboro, N.J., assignor to Radio Corporation of America, a corporation of Delaware Filed May 28, 1964, Ser. No. 370,960
11 Claims. (Cl. 340—174)

The invention relates to electrical circuits and, in particular, to a multistage amplifier arrangement for use with the memory of a high speed digital computer, and to certain novel circuits employed in the amplifier arrangement.

In a two core per bit, word organized memory, each of the two cores of a bit is linked by a different sense line. When the information stored in a pair of cores is read out, a relatively small amplitude signal is induced in each of the associated sense lines. These signals which may be, for example, of the order of twenty to fifty millivolts, generally have the same polarity, but one or the other of the signals has a slightly larger amplitude depending upon whether the core pair was storing a binary "1" or a binary "0" bit of information prior to the read operation. During a write operation, however, when information is written into the core pair, a signal of the order of many volts may be induced in one of the sense lines.

The amplifier must be able to amplify the small difference in amplitude between the read signals and recover rapidly from the large amplitude write signal, without loading down the sense lines and preferably without causing reflections in those lines. The amplified difference signal, which itself has a relatively small amplitude, may be required to switch a bistable element, with the large output of the bistable element being used to write the information back into the core pair. Since the bistable element must respond to a relatively small amplitude difference signal, it is desirable that the output of the amplifier be highly stable and free from drift, lest the bistable element be switched by a change in the output reference level in the absence of information signals.

It is one object of this invention to provide an amplifier arrangement that meets the criteria aforementioned.

It is another object of this invention to provide an amplifier arrangement of the type described that has a number of cascaded stages that are D.C. coupled and that provides balanced outputs referenced to a well-defined voltage level.

It is still another object of this invention to provide a small signal pre-amplifier that effectively limits large amplitude input signals of one polarity, without significant loading on the signal sources, and that recovers rapidly following a large amplitude input signal of the one polarity.

It is yet another object of this invention to provide a differential amplifier that provides, at one of its output terminals, a signal that is the sum of the amplified difference signal and the amplified difference signal delayed and inverted, and provides at its other output terminal a signal that is the sum of the difference signal amplified and inverted and the difference signal amplified and delayed.

It is a further object of this invention to provide a differential amplifier of the type immediately aforementioned in which the two outputs have the same value and are highly stable and free from drift in the quiescent condition of the circuit, irrespective of unbalance in the quiescent inputs or differences in the characteristics of the amplifying devices.

Other objects and novel features of the invention will be apparent from the detailed description of the invention.

Briefly stated, the pre-amplifier comprises a pair of emitter followers each having its control electrode direct current (D.C.) coupled to a different one of two input signal sources. Each emitter circuit includes a first resistor connected in series with the parallel combination of a second resistor and a capacitor. Each emitter may be connected to its respective emitter circuit by way of a transmission line, in which case the first resistor is selected in value to terminate the transmission line in its characteristic impedance. The parallel resistor-capacitor combinations appear as voltage sources to applied input signals, and also bias the respective transistors at desired operating current levels that are independent of transistor characteristics. The capacitors limit the response of the emmitter followers to large amplitude input signals with very little loading on the associated input signal sources.

The differential amplifier has its two input terminals D.C. coupled to the different outputs of the emitter followers. A delay means is connected between the output electrodes of the differential amplifier, and each output electrode also is connected to a point of substantially fixed potential by way of a separate resistor. These resistors are chosen in value to terminate the respective ends of the delay means in its characteristic impedance. Because of the delay means, the two outputs of the differential amplifier have the same value in the quiescent state, are highly stable in value, and are well-defined with respect to a reference potential irrespective of any differences in the characteristics of the amplifying devices or the quiescent inputs thereto.

In the preferred form of the overall amplifier arrangement, the two outputs of the difference amplifier are direct current coupled to another difference amplifier, and the current in one of the amplifying devices of the latter difference amplifier is supplied as switching current to a strobed bistable element.

Figure 1:
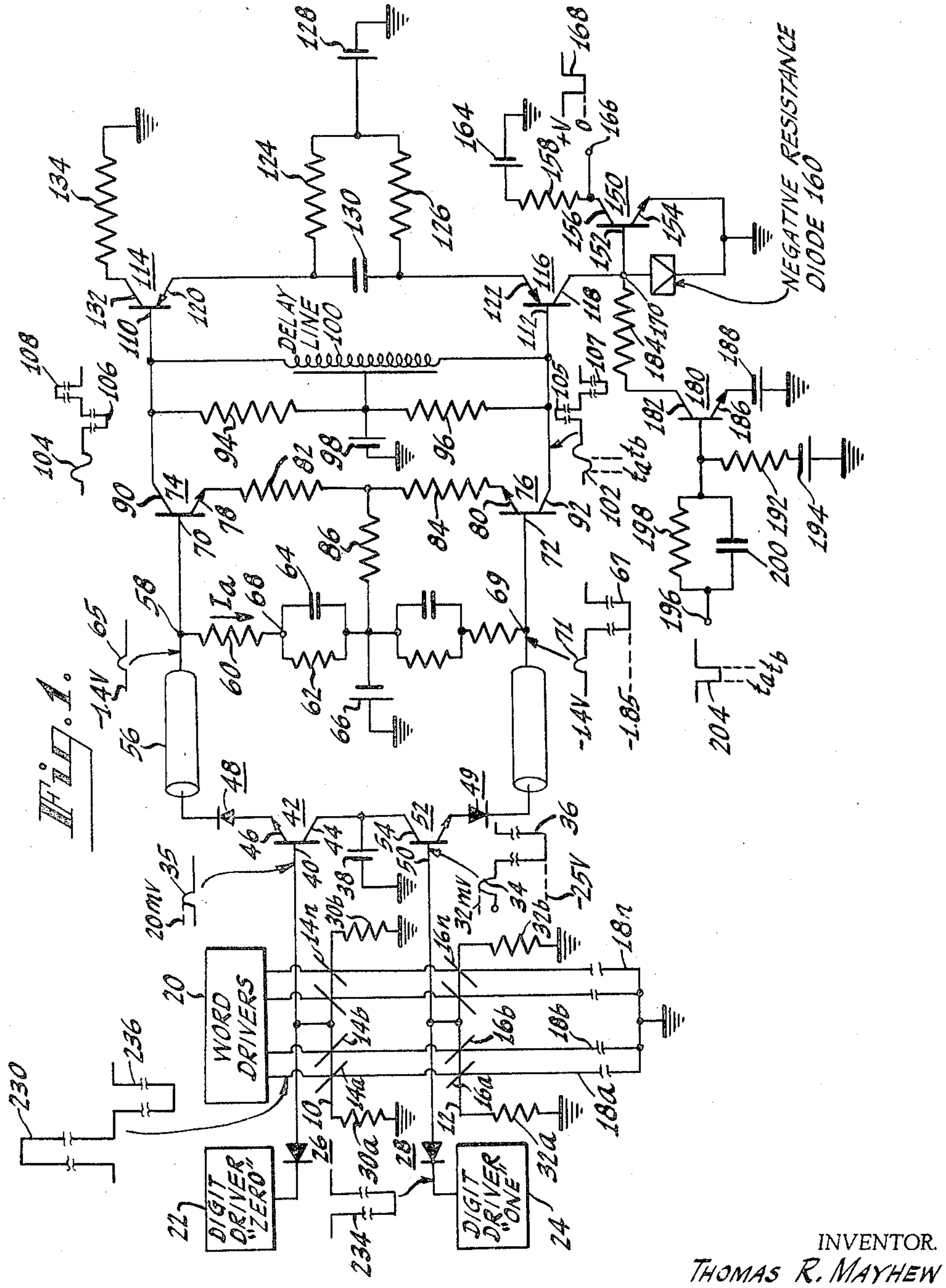
FIGURE 1 is a schematic diagram of a preferred form of the overall amplifier arrangement.

In FIGURE 1, a portion of a two core per bit, word organized memory is shown at the left of the drawing. The memory may comprise a large number of rows and columns of ferrite storage cores, only two rows and four columns of cores being illustrated for convenience. The cores 14*a* . . . 14*n* in the upper row are linked by a first bit line 10, and the cores 16*a* . . . 16*n* in the lower row are linked by a second bit line 12. These bit lines 10, 12 serve the dual function of drive and sense lines. Each of the columns of cores is linked by a separate word line 18*a* . . . 18*n*, and the two cores shown in each column store a bit of information for the respective word. For example, cores 14*a* and 16*a* store one bit of information of a first word. Cores 14*b* and 16*b* store a bit of information of another word, etc. The word lines 18*a* . . . 18*n* are individually energizable from separate word drivers located within box 20.

Bit line 10 has drive signals selectively applied thereto from a first driver 22, labeled "Digit Driver Zero," and bit line 12 has drive signals selectively applied thereto by way of a driver 24, labeled "Digit Driver One." Diodes 26 and 28 assure that signals of only one polarity are applied to the bit lines 10, 12. Bit line 10 is terminated at each end by a different resistor 30*a*, 30*b*, and bit line 12 is terminated at each end by a different resistor 32*a*, 32*b*. At the very high speed operation of interest, the bit lines have some of the characteristics of transmission lines. The resistors 30a, 30b, 32a and 32b terminate the ends of the respective bit lines in their characteristic impedance to prevent reflections in the lines when information is written into or out of the cores.

The particular memory illustrated is a coincident current memory. A binary "one" or "zero" is written into a pair of cores by concurrently activating the Digit Driver One 24 or the Digit Driver Zero 22, respectively, and the work driver linking the particular pair of cores. To write a "one" into the cores 14a, 16a, for example, the word driver connected to line 18a is activated concurrently with the digit driver 24. The combination of currents in bit line 12 and word line 18a switches the core 16a to the "one" state. Cores 14a and 16b . . . 16n are linked by only one current carrying line, and the current in one line is insufficient to switch a core. A large negative signal appears at the center of bit line 12 when Digit Driver One 24 is activated. This signal may have a value of the order of −25 volts.

To read out the information stored in cores 14a and 16a, only the word driver connected to word line 18a is activated, and supplies a large current which is sufficient in itself to switch cores 14a and 16a, and all other cores (not shown) linked by line 18a, to the "zero" state. When core 16a switches back to the zero state, a small signal 34 is induced in the bit line 12. This signal 34, which is positive in polarity, may have an amplitude of about 32 millivolts. Although core 14a was already in the "zero" state and hence did not switch, nevertheless the large current flowing in the word line 18a induces a small signal 35 in bit line 10. This latter signal 35 has a positive polarity and may be of the order of 20 millivolts. Thus, the actual read signal on bit line 12 is only a few millivolts greater in amplitude than the "disturb" signal on bit line 10. It is the function of the amplifier to accept and maplify the small difference between signals 34 and 35 and to limit, and recover rapidly from, the large write signal 36 without loading down the bit lines 10, 12 or causing reflections therein.

In order to reduce the possibility of loading and reflections, the amplifier should have a high input impedance. The first or pre-amplifier stage of the amplifier arrangement comprises a pair of independently operated emitter followers comprising a pair of transistors 42, 52, illustrated as NPN transistors. The base electrodes 40 and 50 of transistors 42 and 52 are d.c. coupled, preferably by negligible impedance means, to the centers of the bit lines 10, 12, respectively. The collector electrodes 44, 54 of the two transistors are connected together by way of negligible impednace means and to the positive terminal of a bias source, illustrated as a battery 38 having its negative terminal connected to circuit ground. The emitter circuits of the two emitter followers are structurally the same, and a description of one will suffice as a description of the other.

The emitter electrode 46 of transistor 42 is connected by way of a diode 48 and a transmission line 56 to a point 58. Diode 48 is poled to pass forward emitter 46 current flowing, in the conventional sense, out of the emitter. In general, it is desirable to have the pre-amplifier transistors 42 and 52, and others not shown, as close to the memory as possible. This avoids the necessity of employing long lines between the bit lines and the transistors 42, 54, and reduces the possibility of noise signals being induced in those connecting lines. It also avoids any upset that long connecting lines might have on the bit line terminations. The remaining portions of the circuit to be described, however, generally will be located relatively remote from the memory. By connecting the emitters of the transistors to the remaining circuitry by way of transmission lines, the possibility of stray noise appearing on the emitter leads is greatly reduced.

A first resistor 60 is connected in series with the parallel combination of a second, large resistor 62 and capacitor 64 between point 58 and the negative terminal of a relatively large bias source, illustrated as a battery 66 having its positive terminal grounded. When the transmission line 56 is employed, first resistor 60 is selected in value to terminate the transmission line 56 in its characteristic impedance, thereby avoiding voltage swings at point 58 due to reflections in the line. Transistor 42 is biased at a desirable operating current level by the combination of the relatively large resistor 62 and battery 66. Because of the by-pass capacitor 64, an insignificant voltage change occurs at the junction 68 under ordinary operating conditions as a result of a signal on bit line 10.

Under some conditions, resistor 62 and capacitor 64 can be replaced by a battery. However, the parallel RC network is preferred because it appears as a voltage source to input signals and, at the same time, allows transistor 42 to be biased at a desired current level which is practically independent of variations in the base 40-emitter 46 voltage drop and variations in the forward voltage drop across diode 48. Moreover, capacitor 64 limits the response of the transistor 42 circuit to large negative write signals or transients at base 40 with very little loading of the bit line 10. In effect, the capacitor 64 and resistor 62 serve as an amplitude limiter, as will be described.

For given operating current levels, in transistor 42, first resistor 60 determines the maximum voltage swing that can occur at point 58 as a result of a large negative write pulse on bit line 10. Consider, for example, that resistor 62, resistor 60 and battery 66 have values of 5.6 Kohms, 90 ohms and 30 volts, respectively, and that the quiescent voltage drops across diode 48 and emitter 46-base 40 junction are each 0.7 volt. The quiescent voltage at point 58 under these conditions is −1.4 volts and a current $$Ia=\frac{30-1.4}{5.69}ma.$$

or approximately five milliamperes flows through resistors 60 and 62. The voltage at junction 68 is −1.85 volts and the drop across first resistor 60 is 0.45 volts. For a small amplitude read signal 34 or 35 of +32 millivolts or +20 millivolts, respectively, applied at base 40, the transient current flowing through first resistor 60 and transistor 42 can easily change to produce a like signal 65 at point 58.

Since transistor 42 is an NPN transistor, however, a negative signal applied at base 40 reduces the emitter 46 current. Regardless of how large the negative signal might be, the emitter 46 current can only fall to zero. Since almost all of the emitter 46 current flows through first resistor 60, the maximum possible negative change at point 58 will be equal to the quiescent operating current of transistor 42 multiplied by the value of resistor 60, or approximately 0.45 volt. Thus, when a −25 volt write pulse is applied at base 40, the change in voltage at point 58 is only −0.45 volt, whereby the particular emitter circuitry has limited the circuit's response to large amplitude negative input signals. Since the emitter circuit of transistor 52 is structurally the same as that for transistor 42, the large negative write signal 36 at base 50 produces a signal 67 of only −0.45 volt magnitude at point 69.

If the negative voltage swing at base 40 should exceed the emitter 46-base 40 junction breakdown voltage when transistor 42 is turned off, a reverse current would flow across the junction in the absence of diode 48. This current could upset the bit line 10 termination and cause an excessive current to flow in the bit line and possibly destroy some of the information stored in the cores linked by that line. Diode 48 is employed in the circuit to prevent this reverse current condition.

The transistors 42 and 52 and diodes 48 and 49 should be selected so that the quiescent voltage at points 58 and 69 are relatively close together. Due to the characteristics of the differential amplifier in the second stage, to be described, these voltages need not be identical. However, they should be close enough in value so that both of the transistors 74 and 76 in the differential amplifier are biased in the "on" condition.

The base electrodes 70 and 72 of the D.C. coupled differential amplifier transistors 74 and 76 are D.C. coupled to the output points 58 and 69, respectively, of the emitter followers. Emitter electrodes 78 and 80 are connected together by way of a pair of stabilizing resistors 82, 84 of relatively low value, and a common emitter resistor 86 is connected between the negative terminal of battery 66 and a point common to the resistors 82, 84. Stabilizing resistors 82 and 84 provide degeneration for reducing gain and rendering the gain more independent of the transistor characteristics. They also help to balance the amplifier direct current-wise. Resistor 86 is chosen to have a relatively large value, whereby the combination of resistor 86 and battery 66 operates to provide a substantially constant current to the differential amplifier for small signal conditions. This provides the characteristic of common mode rejection for small amplitude input signals.

Collector electrodes 90 and 92 are connected by way of separate supply resistors 94 and 96 to the positive terminal of a bias source, illustrated as a battery 98 having its negative terminal grounded. A delay means 100, which could be a transmission line, a lumped constant delay line, or other suitable delay means is connected between the collector electrodes 90 and 92. The shield of the delay line can be connected to the positive terminal of battery 98, although this is not essential for reasons which will be explained later. Collector resistors 94 and 96 are selected in value to terminate each end of the delay means 100 in its characteristic impedance, whereby there are no reflections at the terminations.

Because of the delay means 100, the quiescent voltages at the collector electrodes 90 and 92 are exactly equal. The voltage drop across the parallel combination of collector resistors 94 and 96 is equal to the current through emitter resistor 86, less the small base 70, 72 currents, multiplied by the parallel resistance of resistors 94 and 96. The quiescent collector voltages are essentially fixed in value and independent of the manner in which the current through emitter resistor 86 divides between the transistors 74 and 76. That is to say, regardless of any small difference between the quiescent input voltages at base electrodes 70, 72, the sum of the quiescent collector currents remain substantially constant. Because of the delay means 100, the total collector current divides among resistor 94 and 96 according to their resistances, which are assumed equal. This is a highly advantageous feature in that the quiescent outputs at the collector electrodes 90 and 92 are perfectly balanced regardless of any small unbalance in the quiescent outputs of the preceding stage or in the transistors 74 and 76. For this reason D.C. coupling can be used throughout the amplifier arrangement, and the undesirable charge storage effects of reactance coupling elements is avoided. Moreover, the output voltages of the differential amplifier are not subject to drift, whereby the equal collector 90, 92 voltages provide well-defined and highly stable biases for the transistors 114 and 116 in the following stage, to be described.

The delay means 100 provides another very advantageous result that is not immediately apparent. In the absence of the delay means 100, the differential amplifier would still amplify the small difference between the applied read signals 65 and 71 applied at base electrodes 70 and 72, respectively. Conduction in one of the transistors 74, 76 would increase and conduction in the other transistor would decrease while the signals 65 and 71 were present. In turn, the voltage at one collector electrode 90, 92 would fall in value for the duration of the signal applied to its transistor, and the voltage at the other collector electrode would rise in value. However, since the input signals are of one polarity, the output voltage at any one collector electrode 90 or 92 would change in only one polarity direction, and some problem could be encountered with D.C. level shift when the output signals are applied to an A.C. amplifier. An A.C. amplifier is preferred at the output because of the small amplitude read signals. A high gain D.C. amplifier with low drift is difficult to achieve, and the drift thereof could be as great as the signal to be amplified. This problem of D.C. level shift is avoided by the delay means 100 as follows.

Let it be assumed that the signal 71 at base 72 has a larger amplitude than the signal 65 at base 70. The differential amplifier amplifies this difference. Current in transistor 76 increases and current in transistor 74 decreases an equal amount. As shown by the signals 102 and 104, the voltages at collectors 92 and 90 initially fall and rise in value, respectively. Assuming a substantially constant emitter curent source, the increase in transistor 76 current is equal to the decrease in transistor 74 current and, since collector resistors 94 and 96 are equal, the output signals 102 and 104 are equal in amplitude and opposite in phase.

The negative going signal at collector 92 is applied at the lower end of the delay means 100 and the positive going signal at collector 90 is applied at the upper end of the delay means 100. These two signals, which are equal in magnitude and opposite in phase, emerge from the opposite ends of the delay means 100 after a time T determined by the delay thereof, and add vectorially to the voltages at the receiving collector electrodes. The result is an A.C. signal 102 at collector 92 which is the sum of the amplified and inverted difference signal and the amplified difference signal delayed by the delay means 100. The positive and negative signals are equal in amplitude because the initial signals at collectors 90 and 92 were of equal amplitude but of opposite phase. The A.C. signal 104 at collector 90 is the sum of the amplified difference signal and the amplified and inverted difference signal delayed by the delay means 100. If input signal 65 had a larger amplitude than input signal 71, the output signal 102 would appear at collector electrode 90, and the output signal 104 would appear at collector electrode 92.

There are no reflections at the ends of the delay means 100 because the collector resistors 94 and 96 terminate the respective ends of the delay means in its characteristic impedance. Under these conditions, the outputs of the differential amplifier recover to their quiescent level at a time T after the termination of the input signals 65, 71, where T is equal to the delay of the delay means 100. The differential amplifier then is ready to receive another input signal.

Figure 3:
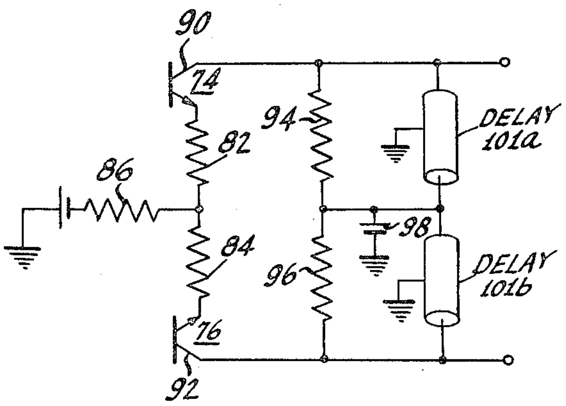
FIGURE 3 is a schematic diagram of another differential amplifier embodying the invention.

Assuming that the signal excursions at collectors 90 and 92 are of equal amplitude and opposite phase, it can be shown that the voltage at the center of the delay means 100 does not change in value. Under these conditions, the delay means 100 could be replaced by two delay means, such as the transmission lines 101*a*, 101*b* in FIGURE 3, of identical characteristics and delay, each of the two delay means 101*a*, 101*b* being connected between a different collector electrode 90, 92 respectively, and a point of fixed potential, for example the positive terminal of battery 98. Under these conditions the quiescent voltages at collector electrodes 90 and 92 would be equal to the battery 98 voltage les any D.C. losses in the respective lines.

It remains to consider the response of the differential amplifier to a large negative write pulse. Assume that the write pulse 36 appears on bit line 12. As mentioned previously, this large signal is substantially limited by the emitter follower, and appears at base electrode 72 as a negative going pusle 67 that is 0.45 volt in amplitude. A signal of this amplitude generally is sufficient to turn off transistor 76, whereby a large positive signal 105 appears at collector 92. Simultaneously, a large negative signal 106 appears at collector 90. The input pulse 67, however, is not greatly amplified because a large degeneration is provided by emitter resistors 86 and 82 if the current tends to exceed the substantially constant current value.

For this reason ,signals 105 and 106 are close in amplitude but opposite in phase.

Transistor 76 remains cut off for the duration of the pulse 67 applied thereto. Assuming that the pulse 67 has a greater width than the delay T of delay means 100, the voltages at collectors 90 and 92 reach their quiescent value after a time T. When the pulse 67 terminates, transistor 76 turns on and approximately one half the current flowing in transistor 74 then is diverted to transistor 76. A negative voltage swing 107 is experienced at collector 92 and an equal amplitude positive voltage swing 108 is experienced at collector 90. After a delay T, the equal amplitude signals emerge at the opposite ends of the delay means 100 and reduce the collector voltages to their quiescent value. Again, no reflections occur at the ends of the delay means because collector resistors 94 and 96 properly terminate their respective ends of the delay means.

The output voltages at collector electrodes 90 and 92 are D.C. coupled to the base electrodes 110 and 112 of a pair of transistors 114, 116, respectively, in an A.C. coupled differential amplifier. Emitter electrodes 120 and 122 are separately connected by way of resistors 124 and 126 to the positive terminal of a bias source, illustrated as a battery 128 having its negative terminal grounded. Emitter electrodes 120 and 122 also are A.C. coupled together by means of a capacitor 130, chosen to have a large value of capacitance at the signal frequencies of interest. Collector electrode 132 is returned to circuit ground by way of a resistor 134, and collector electrode 118 is D.C. connected to the input junction 170 of a bistable stage, to be described.

Although the A.C. coupled differential amplifier provides gain for the difference in the information signals applied at its inputs, it will be remembered that these signals have relatively low amplitudes. Accordingly, the signal current flowing in transistors 114 and 116 are relatively low in magnitude. As will be discussed hereinafter, it is the small signal current of one polarity flowing in transistor 116 that is relied on to switch the bistable stage. For this reason, the bistable stage should be biased close to its switching threshold. This means that the quiescent collector current of transistor 116 should be highly stable in order that the bistable stage not be switched in the absence of input signals applied to one or the other of the transistors 114, 116. This is accomplished by the action of delay means 100, which operates to maintain the quiescent voltage at base electrodes 110 and 112 at equal and fixed values. Although an A.C. coupled differential amplifier is described and shown, a D.C. coupled difference amplifier could be used if the characteristics of transistors 114 and 116 are very closely matched. In that event the capacitor 130 would be replaced by a direct connection.

The bistable stage comprises an NPN transistor 150 having a negative resistance diode 160 connected across its emitter 154-base 152 junction, with the anode of the diode 160 connected at input junction 170. Collector electrode 156 is connected by a supply resistor 158 to the positive terminal of a bias source, illustrated as a battery 164 having its negative terminal connected to emitter 154 by way of circuit ground. An output terminal 166 is connected at collector 156. Diode 160 is one having a volt-ampere characteristic defined by first and second regions of positive resistance separated by a region of negative resistance, and preferably is a tunnel diode.

A second input to the bistable stage is provided by a strobe circuit comprising an NPN transistor 180 having its collector 182 connected by a resistor 184 to the input junction 170 of the bistable stage. Emitter electrode 186 is connected to the negative terminal of a bias source, shown as a battery 188 having its positive terminal grounded. A resistor 192 connects the base 190 to the negative terminal of another bias source, shown as a battery 194 having its positive terminal grounded. Base electrode 190 is connected by a parallel resistor 198-capacitor 200 network to an input terminal 196. The voltage normally applied at input terminal 196 has a value to bias strobe transistor 180 into saturation. Transistor 180 then supplies a current at input junction 170 which is much larger in magnitude and of opposite polarity to the quiescent current supplied at junction 170 by transistor 116 in the A.C. coupled differential amplifier. A negative strobe pulse 204 is applied at input terminal 196 during the time interval $t_a$ to $t_b$ of each memory read cycle and has a value to turn off stroke transistor 180.

Figure 2:
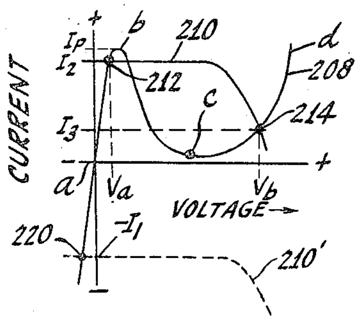
FIGURE 2 is a volt-ampere characteristic of a negative resistance diode suitable for use as the bistable device in the amplifier arrangement.

A volt-ampere characteristic 208 for a typical tunnel diode 160 is given in FIGURE 2. Voltage across the diode 160 is plotted along the abscissa and current through the diode is plotted along the ordinate, with positive current being plotted above and negative current being plotted below the abscissa. By positive current is meant that current which flows through the diode 160, in the conventional current sense, from anode to cathode (from junction 170 to ground). Positive current may be spoken of as "forward" current and current of the other polarity may be considered to be "reverse" diode current. Transistor 116 supplies forward current to tunnel diode 160 and strobe transistor 180 supplies reverse current.

That portion of the characteristic 208 in the first quadrant has a first region *ab* of positive resistance that extends over a small range of relatively low voltage values, a second region *cd* of positive resistance that extends over a larger range of relatively high voltage values, and an intermediate region *bc* of negative resistance. The operating point for the diode is on the portion *ab* or *cd* when the net current flowing through the diode is in the forward direction. The portion *ae* of the characteristic 208 in the third quadrant is substantially linear. Diode 160 operates along the region *ae* when the net current flowing through the diode is in the reverse direction.

Output transistor 150 acts as a load across the tunnel diode 160. The load line in this case has the shape of the transistor 150 input characteristic, and is shown in FIGURE 2 as the curved line 210. The actual position of this load line 210 relative to the characteristic 208 is a function of the net current flowing through the tunnel diode 160. When the load line 210 has the position shown in the first quadrant, it intersects the first and second positive resistance regions at stable operating points 212 and 214. If the diode operating point is the point 212, a forward current $I_2$ flows through the diode and a voltage $+V_a$ appears at junction 170. $V_a$ may have a value of 50 to 70 millivolts, and is insufficient to bias output transistor 150 into conduction. The output voltage at terminal 166 under these conditions is close to the value of battery 164.

If the diode 160 current is increased momentarily in a positive direction to a value greater than $I_p$, corresponding to the peak *b* of the characteristic 208, the tunnel diode 160 switches rapidly through its negative resistance region and reaches the stable operating point 214. The resulting voltage $+V_b$ at junction 180 is positive enough to bias output transistor 150 into conduction, and a current $I_2$–$I_3$ flows into the base 152. The voltage at the output terminal 166 may be close to ground potential. Tunnel diode 160 remains biased in the region *cd* until the net current flowing through the diode is reduced below a value corresponding to point *c*; whereupon the diode switches back to the low voltage region *ab* or *ae*.

The components of the strobe circuit and the quiescent voltage at input terminal 196 are selected so that strobe transistor 180 supplies a reverse current at junction 170 that is large enough to overcome the forward current from transistor 116 and bias the tunnel diode at point 220. The load line then has the position shown by dashed line 210′. A reverse current $-I_1$ then flows through the diode 160. Tunnel diode 160 then cannot be switched to its high voltage state unless the signals applied to the transistors 114 and/or 116 increase the transistor 116 output current by an amount $|I_1|+|I_p|$. The current $I_1$ is selected in value so that the tunnel diode 160 cannot be switched, even under worst case conditions, while the strobe transistor 180 is biased on.

However, when a strobe pulse 204 is applied at input terminal 196, strobe transistor 180 is turned off and no reverse current is supplied to the tunnel diode 160. The operating point on the characteristic 208 then is determined by the collector 118 current in transistor 116, and the quiescent value for this current is adjusted to be equal to $I_2$. Accordingly, tunnel diode 160 is biased at operating point 212, and a positive small signal current $I_p-I_2$ in transistor 116 will switch the tunnel diode to the high voltage state and turn on output transistor 150. When the strobe pulse 204 is terminated, the large reverse current is again supplied to the diode and switches the diode back to the operating point 220. This large reverse current also provides a large turn-off overdrive for the output transistor 150.

Operation of the overall amplifier arrangement may be summarized by considering a typical cycle of operation. A memory cycle includes a read operation followed by a write operation. During the read operation, information stored in the cores linked by a desired one of the word lines 18*a* . . . 18*n* is read out. During the write operation, either the information read out or new information is written into the cores linked by that desired word line. Prior to the read operation, transistors 42 and 52, 74 and 76 and 114 and 116 are conducting, the two transistors of any pair conducting substantially equal currents. Transistor 116 supplies a positive current $I_2$ at the input junction 170 of the bistable stage, but strobe transistor 180 is conducting and supplies sufficient reverse current to bias the tunnel diode 160 at the operating point 220 (FIGURE 2). Output transistor 150 is nonconducting and the voltage at output terminal 166 is +V volts.

Assume that memory cores 14*a* and 16*a* are storing a binary "one" bit of information. This means that core 16*a* previously was switched to the "one" state. To read out these cores, a positive pulse 230 of current is applied to word line 18*a*. Core 16*a* switches to the "zero" state and a positive signal 34 is induced in the bit line 12. Core 14*a* does not switch, but the large read signal 230 induces a signal 35 in bit line 10, which signal has a smaller amplitude than signal 34. These signals 35 and 34 are passed by the emitter followers with little attenuation and appear as signals 65 and 71 at the base electrodes 70 and 72, respectively, of the transistors 74 and 76 in the D.C. coupled differential amplifier.

Conduction increases in transistor 76 and decreases a like amount in transistor 74 since signal 71 is large in amplitude than signal 65. Accordingly, the voltages at collectors 92 and 90 initially fall and rise in value, respectively. The signals appearing at collectors 90 and 92 are coupled by the delay means 100 to the other collectors 92 and 90, respectively, to provide a pair of A.C. signals 102 and 104 at the collectors 92 and 90. Signal 102 comprises a negative going portion during the period $t_a$ to $t_b$ followed by a like amplitude positive going signal.

The A.C. coupled difference amplifier amplifies the difference between signals 102 and 104. The amplified signal current flowing into collector 92 is opposite in phase to the signal 102, whereby the collector 92 current increases above its quiescent value $I_2$ during the negative going half of signal 102, from $t_a$ to $t_b$, and decreases below $I_2$ during the positive going half of the signal. The quiescent current $I_2$ is selected in value so that the collector 92 increases above a value $I_p$ (FIGURE 2) during the negative going half of signal 102.

A strobe pulse 204 is applied at the strobe input terminal 196 to turn off the strobe transistor 180 during the period $t_a$ to $t_b$ of the read cycle. Accordingly, the only current supplied at the input junction 170 of the bistable stage during the period $t_a$ to $t_b$ is current from the transistor 116 circuit. Since this latter current is greater than $I_p$, for the conditions given, the tunnel diode 160 switches to the high voltage state, output transistor 150 turns on, and a negative going output signal 168 appears at output terminal 166. Strobe pulse 204 terminates at time $t_b$, strobe transistor 180 turns on and supplies a large reverse current to switch the tunnel diode back to the low voltage state and turn off output transistor 150. Tunnel diode 160 cannot switch again until the next strobe pulse 204 is applied during the next read cycle.

As mentioned previously, the signal 104 would have appeared at collector 92, and the signal 102 would have appeared at collector 90 if the cores 14*a* and 16*a* had been storing a binary "zero" prior to the read operation. Under those conditions, the collector 118 current in transistor 116 would have been less than $I_2$ during the period $t_a$ to $t_b$, the tunnel diode 160 would not have switched to the high voltage state, and no output pulse 168 would have been generated.

The output pulse 168 may be used to activate the Digit Driver One 24 to write a binary "one" back into core 16*a*. Digit Driver One 24 then supplies a large negative pulse 234 to bit line 12 during the write cycle. Concurrently, the selected word driver supplies a large negative pulse 236 to word line 18*a*. These pulses combine to switch core 16*a* to the "one" state.

A large negative going pulse 36 appears at the base 50 of emitter follower transistor 52 when the Digit Driver One 24 is activated. Because of the emitter bias circuit, the resulting negative pulse 67 at the base 72 of transistor 76 is limited in magnitude to about 0.45 volt. Although this pulse 67 is amplified by the D.C. and A.C. coupled differential amplifiers, it does not switch the tunnel diode 160 since strobe transistor 180 remains conducting and supplies a large reverse current to the tunnel diode.

Although not intending to be limited thereto, the circuit components in the amplifier arrangement may have the following values, by way of example:

*Resistors*

| | Ohms |
|---|---|
| **30***a*, **30***b*, **32***a*, **32***b* | 300 |
| **60** | 90 |
| **62** | 5,000 |
| **82**, **84** | 15 |
| **86** | 2,550 |
| **94**, **96** | 90 |
| **124**, **126** | 4,640 |
| **134** | 100 |
| **158** | 820 |
| **182** | 270 |
| **192** | 56,000 |
| **198** | 1,200 |

*Capacitors*

| | | |
|---|---|---|
| **64** | μfarads | 2.2 |
| **130** | μfarads | 2.2 |
| **200** | μμfarads | 12 |

*Bias sources*

| | Volts |
|---|---|
| **38** | 5 |
| **66** | 25 |
| **98** | 5 |
| **128** | 25 |
| **164** | 5 |
| **188** | 3 |
| **194** | 20 |

*Transistors*

| | |
|---|---|
| **42**, **52** | 2N708 |
| **74**, **76** | 2N709 |
| **114**, **116** | 2N976 |
| **150** | 2N955A |
| **180** | 2N834 |

What is claimed is:

1. The combination comprising:

an amplifying device having a first electrode and an ouput electrode defining a conduction path, and a control electrode;

a transmission line, a first resistor and a second resistor serially connected between the first electrode and a junction point;

means for connecting a source of bias potential between said output electrode and said junction point;

a by-pass capacitor connected across said second resistor;

said first resistor having a value to terminate the transmission line in its characteristic impedance, and said second resistor having a value to bias the amplifying device at a desired quiescent operating current level; and input signal means coupled to said input electrode.

2. The combination comprising:

a transistor having a base, an emitter and a collector and being connected in the common collector configuration;

an emitter circuit connected between the emitter electrode and a point of fixed potential, and comprising, in the order named, a unidirectional conducting device, a transmission line, a first resistor, and the parallel combination of a second resistor and a capacitor;

said first resistor having a value to terminate the transmission line in its characteristic impedance;

said unidirectional conducting device being connected to pass conventional transistor current in the easy current flow direction of the unidirectional conducting device; and means for applying input signals at the base electrode.

3. The combination comprising:

a transistor having a base, an emitter and a collector; first and second terminals;

a transmission line connected between said emitter and the first junction point;

a first resistor and the parallel combination of a second resistor and a by-pass capacitor serially connected between the first and second terminals, said first resistor having a value to terminate the transmission line in its characteristic impedance;

means for connecting a bias source means between said collector electrode and the second terminal; and means for coupling input signals to said base electrode.

4. The combination comprising:

first and second amplifying devices each having a first electrode and an output electrode defining a current carrying path, and having also a control electrode;

a point of reference potential;

substantially constant current means connected in common between each said first electrode and said point of reference potential;

a delay means directly connected between the output electrodes of the two amplifying devices and having a characteristic impedance;

separate resistor elements respectively connected between each output electrode and a point of fixed potential said resistor elements having values to terminate each end of the delay means in its characteristic impedance; and first and second input means each coupled to the input electrode of a different amplifying device.

5. The combination comprising:

first and second transistors of the same conductivity type, each having a collector, an emitter, and a base;

a source of substantially constant current connected in common to the emitter electrodes of the first and second transistors;

a separate supply resistor connected between each different collector electrode and a point of fixed potential;

delay means connected between the collector electrodes of the two transistors; and means for separately applying input signals at the base electrodes of the two transistors.

6. The combination comprising:

first and second transistors of the same conductivity type, each having a collector, a base and an emitter;

a resistor and a source of bias potential serially connected between a point of reference potential and a point common to the emitters of the first and second transistors, said source having a value and polarity to forward bias the emitter-base junction of at least one of the transistors in the quiescent state;

delay means connected between the collectors of the two transistors;

first and second resistors, and means connecting each resistor between the collector of a different transistor and said point of reference potential, each said resistor having a value to terminate its respective end of the delay means in its characteristic impedance; and means for applying first and second input voltages at the base electrodes of the first and second transistors, respectively.

7. The combination comprising:

first and second amplifying devices each having a first electrode and an output electrode defining a current carrying path, and having also a control electrode;

a point of reference potential;

substantially constant current means connected between said point of reference potential and a point common to the first electrodes of the first and second amplifying devices;

first and second delay means each connected between a different said output electrode and a point of fixed potential;

first and second resistance means, and means connecting each of said resistance means between a different said ouput electrode and said point of reference potential, each of sair resistance means having a value to terminate one end of its associated delay means in its characteristic impedance; and first and second input means coupled to the input electrodes of the first and second amplifying devices, respectively.

8. An amplifier arrangement comprising:

first and second signal sources;

first and second separate emitter followers, each emitter follower including: a transistor connected in the common collector configuration and having a base electrode and an emitter electrode, an output terminal, a transmission line connected between the emitter electrode and the output terminal, a first resistor, the parallel combination of a second resistor and a by-pass capacitor, means connecting the first resistor and the parallel combination in series between the output terminal and a point of reference potential, the first resistor having a value to terminate the transmission line in its characteristic impedance;

means direct current coupling said first and second signal sources to the base electrodes of the transistors in the first and second emitter followers, respectively;

a difference amplifier including a pair of transistors of like conductivity type each having base, emitter and collector electrode, substantially constant current means connected between said point of reference potential and a point common to the emitter electrodes of said pair of transistors, delay means connected between the collector electrodes of said pair of transistors, a pair of resistance elements and means connecting each resistance element between the collector electrode of a different one of said pair of transistors and said point of reference potential, each said resistance element having a value to terminate the associated end of said delay means in its characteristic impedance;

means direct current coupling the base electrode of each of said pair of transistors to the output terminal of a different one of said emitter followers;

a bistable storage element; and means for applying the output at the collector electrodes of one of the difference amplifier transistors to said bistable element.

9. An amplifier arrangement comprising:

first and second signal sources;

first and second separate emitter followers, each emitter follower including: a transistor connected in the common collector configuration and having a base electrode and an emitter electrode, an output terminal coupled to the emitter electrode, a first resistor, the parallel combination of a second resistor and a by-pass capacitor, and means connecting the first resistor and the parallel combination in series between the emitter electrode and a point of reference potential;

means direct current coupling said first and second signal sources to the base eletcrodes of the transistors in the first and second emitter followers, respectively;

a difference amplifier including a pair of transistors of like conductivity type each having base, emitter and collector electrodes, substantially constant current means connected between said point of reference potential and a point common to the emitter electrodes of said pair of transistors, delay means connected between the collector electrodes of said pair of transistors, a pair of resistance elements and means connecting each resistance element between the collector electrode of a different one of said pair of transistors and said point of reference potential, each said resistance element having a value to terminate the associated end of said delay means in its characteristic impedance;

means direct current coupling the base electrode of each of said pair of transistors to the output terminal of a different one of said emitter followers;

a bistable storage element; and means for applying the output at the collector electrode of one of the pair of difference amplifier transistors to said bistable element.

10. An amplifier arrangement comprising:

first and second signal sources;

first and second separate emitter followers, each emitter follower including: a transistor connected in the common collector configuration and having a base electrode and an emitter electrode, an output terminal, a transmision line connectcd between the emitter electrode and the output terminal, a first resistor, the parallel combination of a second resistor and the by-pass capacitor, means connecting the first resistor and the parallel combination in series between said output terminal and a point of reference potential, the first resistor having a value to terminate the transmission line in its characteristic impedance;

means direct current coupling said first and second signal sources to the base electrodes of the transistors in the first and second emitter followers, respectively;

a difference amplifier including a pair of transistors of like conductivity type each having base, emitter and collector electrodes substantially constant current means connected between said point of reference potential and a point common to the emitter electrodes of said pair of transistors, delay means connected between the collector electrodes of said pair of transistors, a pair of resistance elements and means connecting each resistance element between the collector electrode of a different one of said pair of transistors and said point of reference potential, each said resistance element having a value to terminate the associated end of said delay means in its characteristic impedance;

means direct current coupling the base electrode of each of said pair of transistors to the output terminal of a different one of said emitter followers;

a bistable storage element; and means for applying the output at the collector electrode of one of the pair of difference amplifier transistors to said bistable element.

11. An amplifier arrangement comprising:

first and second signal sources;

first and second separate emitter followers, each emitter follower including: a transistor connected in the common collector configuration and having a base electrode and an emitter electrode, an output terminal, a transmission line connected between the emitter electrode and the output terminal, a first resistor, the parallel combination of a second resistor and a by-pass capacitor, means connecting the first resistor and the parallel combination in series between said output terminal and a point of reference potential, the first resistor having a value to terminate the transmission line in its characteristic impedance;

means direct current coupling said first and second signal sources to the base electrodes of the transistors in the first and second emitter followers, respectively;

a difference amplifier including a pair of transistors of like conductivity type each having base, emitter and collector electrodes, substantially constant current means connected between said point of reference potential and a point common to the emitter electrodes of said pair of transistors, delay means connected between the collector electrodes of said pair of transistors, a pair of resistance elements and means conecting each resistance element between the collector electrode of a different one of said pair of transistors and said point of reference potential, each said resistance element having a value to terminate the associated end of said delay means in its characteristic impedance;

means direct current coupling the base electrode of each of said pair of transistors to the output terminal of a different one of said emitter followers;

a bistable storage element having a reset state and a set state, and being switchable from the reset state to the set state in response to a net applied input current of a first polarity that exceeds a value $I_p$;

amplifier means having an input direct current coupled to the collector electrode of one of said pair of transistors, and having an output direct current coupled to said bistable storage element;

means biasing said amplifier means to quiescently supply a current $I_1 < I_p$ of said first polarity to said bistable element;

a source of current of a second polarity opposite said first polarity; and selectively operable switch means coupling said source to said bistable element.

References Cited

UNITED STATES PATENTS 3,319,233 5/1967 Amemiya et al. ----- 340—174

BERNARD KONICK, *Primary Examiner.*

P. SPERBER, *Assistant Examiner.*